(12) United States Patent
Morgan (10) Patent No.: US 8,938,550 B2
(45) Date of Patent: *Jan. 20, 2015

(54) AUTONOMOUS NETWORK STREAMING (75) Inventor: Peter Aziz Morgan, Natick, MA (US)

(73) Assignee: Microsoft Corporation, Redmond, WA (US)

( * ) Notice: Subject to any disclaimer, the term of this patent is extended or adjusted under 35 U.S.C. 154(b) by 398 days.

This patent is subject to a terminal disclaimer.

(21) Appl. No.: 13/327,695

(22) Filed: Dec. 15, 2011

(65) Prior Publication Data

US 2013/0159381 A1 Jun. 20, 2013

(51) Int. Cl.
| | |
|---|---|
| G06F 15/16 | (2006.01) |
| G06F 9/445 | (2006.01) |
| G06F 9/50 | (2006.01) |
| G06F 17/30 | (2006.01) |
| G06F 9/44 | (2006.01) |

(52) U.S. Cl.
CPC .............. *G06F 8/60* (2013.01); *G06F 9/5077* (2013.01); *G06F 17/30153* (2013.01); *G06F 9/4416* (2013.01)
USPC ................ 709/231; 717/174; 717/176; 718/1

(58) Field of Classification Search
CPC ... G06F 8/60; G06F 9/5077; G06F 17/30153; G06F 9/4416
USPC ......................... 709/231; 717/174, 176; 718/1
See application file for complete search history.

(56) References Cited

U.S. PATENT DOCUMENTS

| | | | | |
|---|---|---|---|---|
| 5,953,729 | A  * | 9/1999 | Cabrera et al. ......................... 1/1 |
| 8,495,625 | B1 * | 7/2013 | Sanders ......................... 717/177 |
| 2001/0034736 | A1 * | 10/2001 | Eylon et al. .................... 707/200 |
| 2002/0133491 | A1 * | 9/2002 | Sim et al. .......................... 707/10 |
| 2006/0036568 | A1 * | 2/2006 | Moore et al. ........................ 707/1 |
| 2006/0235871 | A1 * | 10/2006 | Trainor et al. ................. 707/102 |
| 2008/0010382 | A1 | 1/2008 | Ratakonda et al. | |

(Continued)

OTHER PUBLICATIONS

Friedland, et al., "Towards a Demand Driven, Autonomous Processing and Streaming Architecture", In Proceedings of the 12th IEEE International Conference and Workshops on Engineering of Computer-Based Systems, Apr. 4-7, 2005, pp. 473-480.

(Continued)

*Primary Examiner* — Shirley Zhang
(74) *Attorney, Agent, or Firm* — Kate Drakos; David Andrews; Micky Minhas (57) ABSTRACT

Embodiments are directed to dynamically delivering virtual software applications and to allocating application data between local and network data stores. In one scenario, a computer system establishes a data input/output (I/O) filter configured to intercept data file requests being sent from a virtual software application to an operating system's file system. The data I/O filter intercepts a data file read request that is configured to retrieve a specified data file from the file system. The data I/O filter forwards the intercepted read request to a network-accessible data store that is configured to return the specific data file. Then, upon receiving the specified data file from the network data store, the I/O filter sends the specified data file to the virtual software application. In this manner, the specified data file is usable by the virtual application.

20 Claims, 4 Drawing Sheets

(56) References Cited

U.S. PATENT DOCUMENTS

| | | | |
|---|---|---|---|
| 2008/0059645 A1 | 3/2008 | Gregotski et al. | |
| 2009/0125625 A1 | 5/2009 | Shim et al. | |
| 2009/0293054 A1* | 11/2009 | Sheehan et al. | 718/1 |
| 2010/0161823 A1 | 6/2010 | Jung et al. | |
| 2010/0333085 A1* | 12/2010 | Criddle et al. | 717/178 |
| 2011/0029968 A1* | 2/2011 | Sanders et al. | 717/178 |
| 2011/0106937 A1 | 5/2011 | Upham et al. | |
| 2012/0066677 A1* | 3/2012 | Tang | 718/1 |

OTHER PUBLICATIONS

Olzak, Tom, "Desktop Application Virtualization and Application Streaming: Function and Security Benefits", Published on: Aug. 2007, Available at: http://www.infosecwriters.com/text_resources/pdf/Desktop_Virtualization_TOlzak.pdf.

"Deploy Virtual Applications to Image", Retrieved on: Oct. 31, 2011, Available at: http://www.tmurgent.com/AppV_DeployNPublishApp/With_VDI/Deploy_Virtual_Applications_To_Cache.aspx.

* cited by examiner

AUTONOMOUS NETWORK STREAMING

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In each case, the software applications interact with and use different hardware components of the hosting computer system. For instance, a software application may interact with a local data store such as a hard disk, DVD drive or flash drive. Typically, an application makes input/output (I/O) requests which are sent from the application to the operating system's file system. The file system accesses the necessary data from the disk, and returns it to the application. In cases where virtual applications are used, instead of retrieving the data solely from the local hard disk, at least a portion of the data is requested from a remote data store (usually a network file server). That data is then received at the computer system and stored on its local hard disk. The computer's file system then sends the data to the application as it normally would with locally stored data.

BRIEF SUMMARY

Embodiments described herein are directed to dynamically delivering virtual software applications and to allocating application data between local and network data stores. In one embodiment, a computer system establishes a data input/output (I/O) filter configured to intercept data file requests being sent from a virtual software application to an operating system's file system. The data I/O filter intercepts a data file read request that is configured to retrieve a specified data file from the file system. The data I/O filter forwards the intercepted read request to a network-accessible data store that is configured to return the specific data file. Then, upon receiving the specified data file from the network data store, the I/O filter sends the specified data file to the virtual software application. In this manner, the specified data file is usable by the virtual application.

In another embodiment, a computer system allocates application data between local and network data stores. The computer system receives from an administrative user an indication of which specified portions of a virtual application are to be stored in a local data store and which portions are to be stored in a network data store. The computer system generates different portions of metadata describing which specified portions of the virtual application are stored on the local data store. It then receives a data file request from a virtual application requesting the data of a specified data file and determines, based on the generated metadata, whether the specified data file is stored on the local data store or the remote data store. Then, based on the determination, the computer system sends the data file request to either the local data store or the remote data store.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Embodiments described herein are directed to dynamically delivering virtual software applications and to allocating application data between local and network data stores. In one embodiment, a computer system establishes a data input/output (I/O) filter configured to intercept data file requests being sent from a virtual software application to an operating system's file system. The data I/O filter intercepts a data file read request that is configured to retrieve a specified data file from the file system. The data I/O filter forwards the intercepted read request to a network-accessible data store that is configured to return the specific data file. Then, upon receiving the specified data file from the network data store, the I/O filter sends the specified data file to the virtual software application. In this manner, the specified data file is usable by the virtual application.

In another embodiment, a computer system allocates application data between local and network data stores. The computer system receives from an administrative user an indication of which specified portions of a virtual application are to be stored in a local data store and which portions are to be stored in a network data store. The computer system generates different portions of metadata describing which specified portions of the virtual application are stored on the local data store. It then receives a data file request from a virtual application requesting the data of a specified data file and determines, based on the generated metadata, whether the specified data file is stored on the local data store or the remote data store. Then, based on the determination, the computer system sends the data file request to either the local data store or the remote data store.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Figure 1:
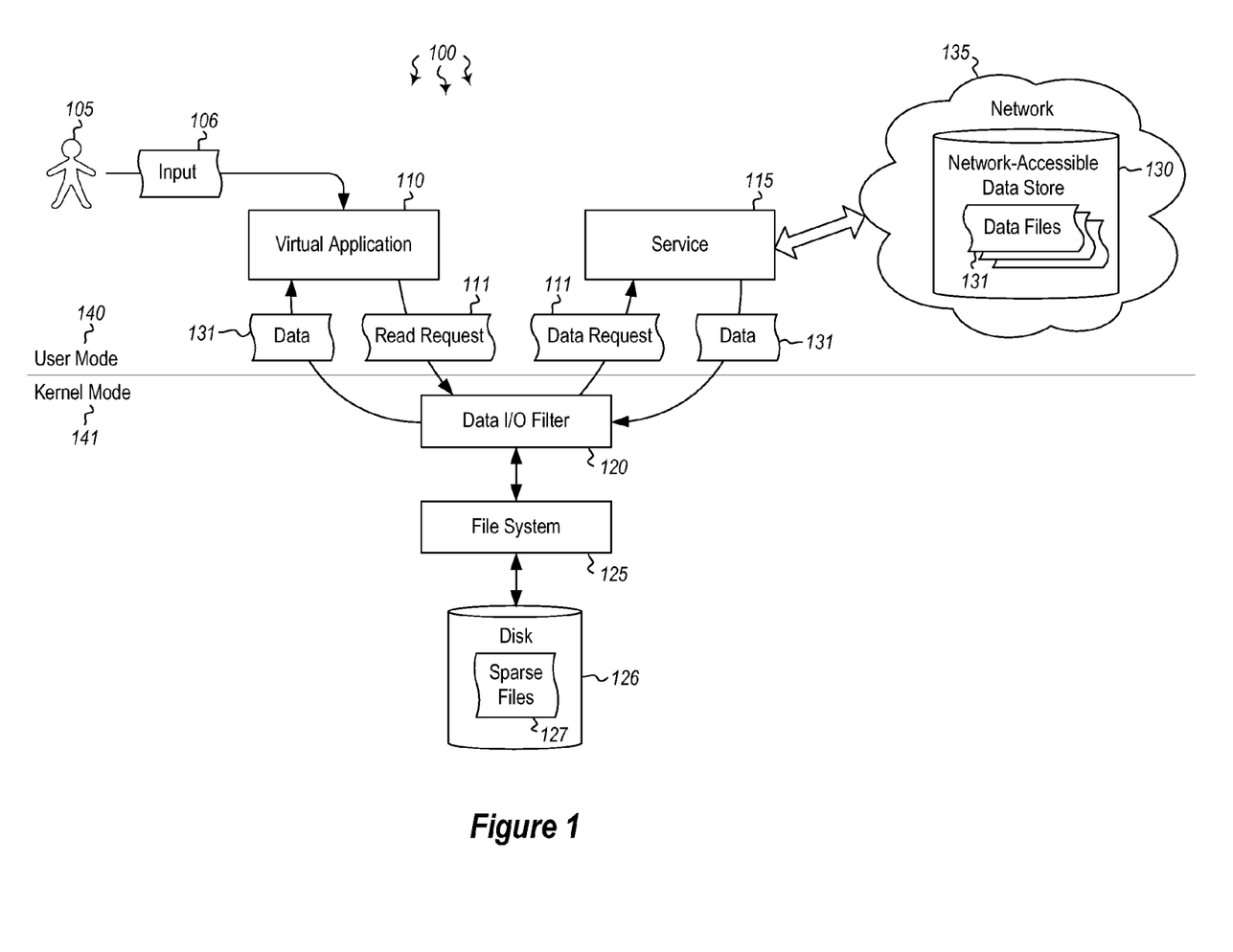
FIG. 1 illustrates a computer architecture in which embodiments of the present invention may operate including dynamically delivering virtual software applications.

FIG. 1 illustrates a computer architecture 100 in which the principles of the present invention may be employed. Computer architecture 100 includes a computer system that operates in at least a user mode 140 and a kernel mode 141. The computer system may be any type of local or distributed computer system, including a cloud computing system. Each mode of operation includes different modules configured to perform specific types of operations. These operating modes and computer system modules may be used to deploy virtual applications in a seamless and efficient manner.

Virtual software applications, as referred to herein, are applications that appear to be locally run, but are actually run on a network application server. The network application server provides the data for the application to the user over the network. In embodiments herein, a user may begin the process by opening an application has he or she normally would by clicking an application icon (or on a data file that is to be opened by a virtual application. Upon receiving the initiating signal from the user, the operating system initializes process address space for the application's executable file(s) by reading the executable file(s) into memory. It should be noted that, as the term is used herein, "data file" may refer to both a data file that comprises settings files (that are typically not part of the executable code) and/or an image that contains the application's executable binary files. As both settings files and executable files are anticipated and supported herein, the term data files will be used to describe them herein.

The operating system then sets the instruction pointer to the entry point for the application, and runs the process. A virtualization layer within the operating system detects and initializes itself during this launch phase. The virtual application is then running on the user's computer system.

In some cases, the virtual applications data files are streamed dynamically as they are needed. When the virtual application is published on a target computer system, only sparse data files are created. Sparse data files "look" like normal data files, but only a placeholder exists for the file. The placeholder includes the file's name and size. The content for the data file corresponding to the sparse file has not yet been streamed. The streaming is performed once the actual data for the file is requested. At that point, the data for that file is streamed from the network-accessible data store 130. Typically, a data file's actual data is not needed until the operating system reads the executable file(s) into memory. In other implementations, the file data would be streamed and copied, and the operating system's read request would be satisfied from the data that had been streamed and copied to the computer system's local hard drive (or other data store).

Embodiments described herein, however, do not copy the contents of the file to the local hard disk. The streamed content is intercepted by a data input/output (I/O) filter before it can be stored on disk. The data I/O filter passes the streamed data to the application to satisfy the read request. The application then uses the streamed data to operate as it normally would, without any of the streamed data being written to disk. Indeed, the virtual application does not even know (or need to know) that its read request was not satisfied by the local hard drive, but rather by dynamically streamed data. No changes need to be made to the virtual application or the computer system's file system. Rather, the data I/O filter operates seamlessly in the middle to provide a dynamically streamed virtual application. This same virtual software application (stored on the network data store) can be provided to substantially any number of other computer systems and/or virtual machines. Furthermore, when the same application is used across multiple different computer systems, disk space will not be duplicated, as a single copy of the application on a server can be streamed to each of the different computer system. These concepts will be explained further below with regard to methods 200 and 300 of FIGS. 2 and 3, respectively.

Figure 2:
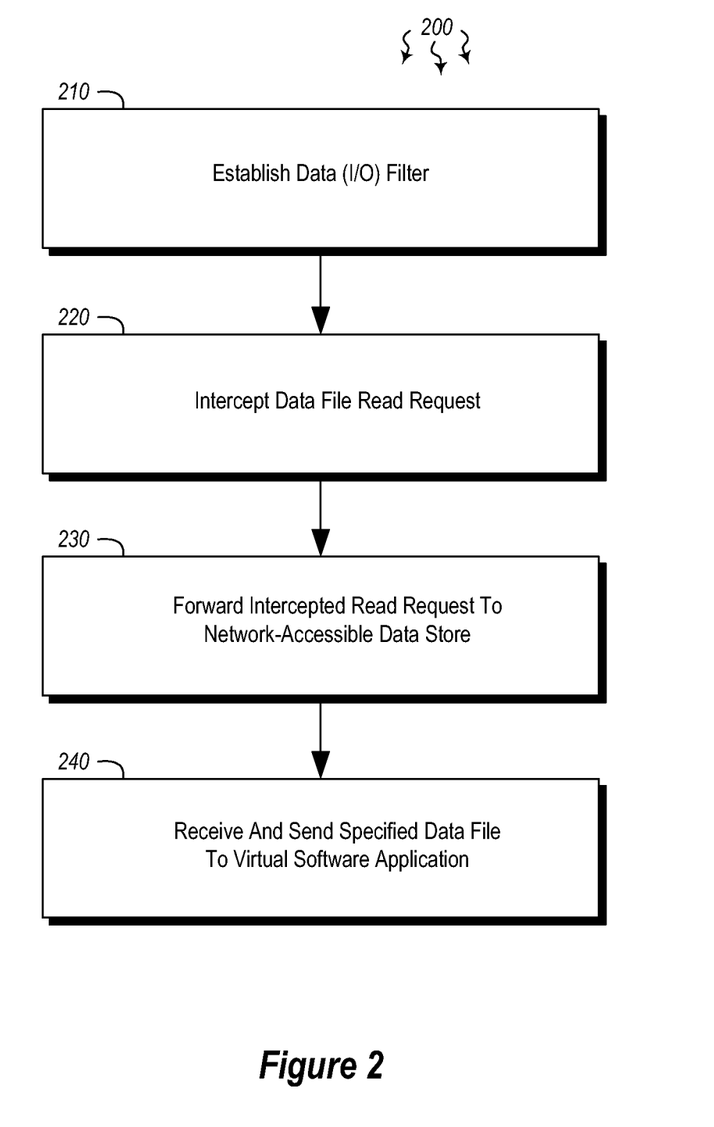
FIG. 2 illustrates a flowchart of an example method for dynamically delivering virtual software applications.
Figure 3:
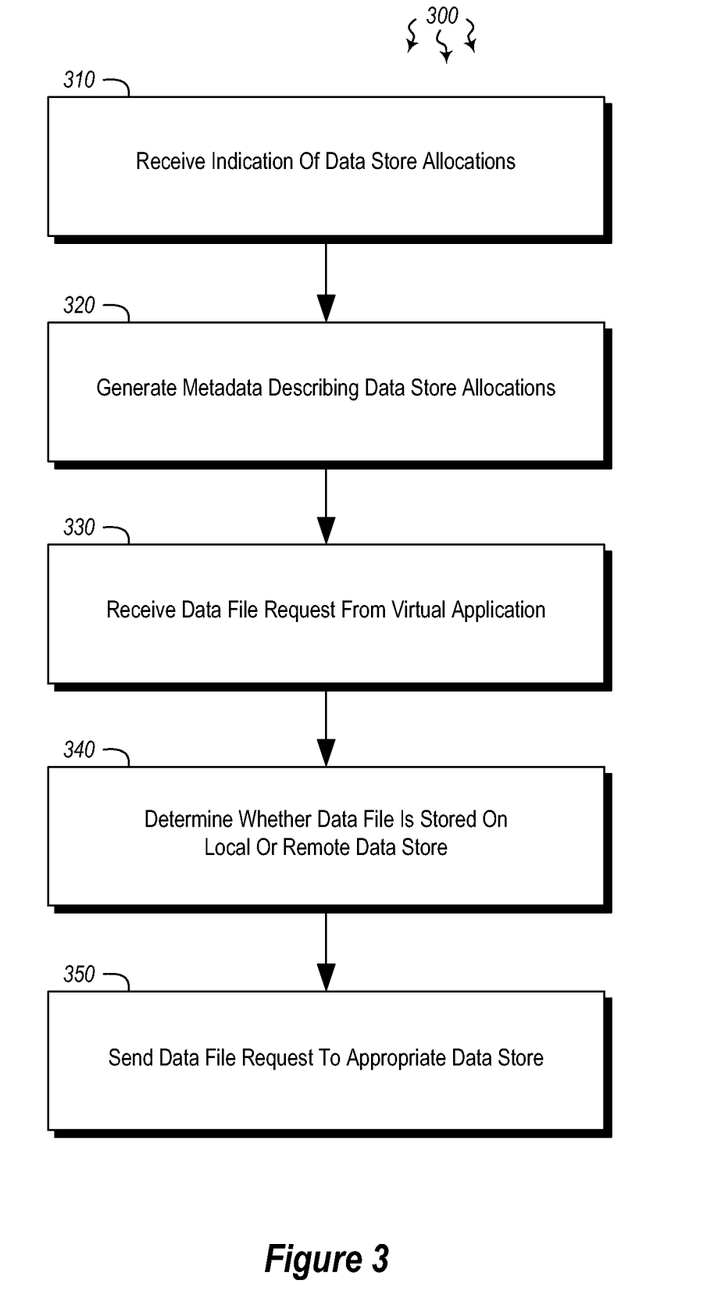
FIG. 3 illustrates a flowchart of an example method for allocating application data between local and network data stores.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for dynamically delivering virtual software applications. The method 200 will now be described with frequent reference to the components and data of environment 100.

Method 200 includes an act of establishing a data input/output (I/O) filter configured to intercept data file requests being sent from a virtual software application to an operating system's file system (act 210). For example, data I/O filter 120 may be established in an operating system kernel mode 141 of a client computer system. The data I/O filter may intercept read request 111 sent from virtual application 110. The data request is a normal application read request, typically sent from the virtual application to the file system 125. In this case, the data I/O filter intercepts the read request that would otherwise be sent to the file system (and, then to disk 126). The I/O data filter is implemented without making changes to how the software application requests data files. As such, the traditional software stack remains unmodified. In some cases, the I/O filter may be a driver running as part of an operating system process.

Method 200 then includes an act of the data I/O filter intercepting a data file read request that is configured to retrieve a specified data file from the file system (act 220). For example, data I/O filter 120 may intercept read request 111 before it is sent to the file system 125. The read request is a request for a data file that the virtual application 110 is attempting to access. The data file, rather than being stored on the local disk, is stored in the network-accessible data store 130. For each file that is requested, a sparse file 127 is dynamically created on the disk 126. As explained above, the sparse file is a placeholder file that includes only the file's name and size, but no actual file data. The placeholder satisfies the virtual applications initial request to determine whether the file exists. When the virtual application is satisfied that the file exists (after it reads the sparse file), the application requests the file's actual data in read request 111.

This process of intercepting read requests may occur for each file of the application. Accordingly, each file may be dynamically streamed to the virtual application as each file is needed. The files may be streamed singularly or in plural. In some cases, multiple data files may be requested and streamed in parallel. As the read request is received at the data I/O filter, the request is converted to a kernel-mode I/O request which is intercepted by the I/O filter. The data I/O filter then forwards the intercepted read request to the network-accessible data store 130, which is configured to return the specific data file 131 (act 230). In some cases, the intercepted request may be forwarded to a user-mode service 115 that sits between the network-accessible data store and the data I/O filter. The user-mode service may run on the user's computer system or on another network-linked computer system. The system receives data requests 111 from the data I/O filter and forwards the requests on to the network data store. The service may also be used to receive the requested data from the network store and pass it on to the data I/O filter. In some cases, the network data store may comprise the cloud (or the internet), and, as such, the specified data files may be retrieved from the cloud/internet using the hypertext transfer protocol (HTTP).

Then, upon receiving the specified data file from the network-accessible data store, the I/O filter sends the specified data file to the virtual software application, so that the specified data file is usable by the virtual application in response to its read request (act 240). Thus, a data request 111 may be intercepted before being sent to disk, and forwarded to a service that fetches the data from a local or remote data store 130. The service then forwards the fetched data 131 back to the I/O filter and the I/O filter forwards the data to the virtual application 110. Accordingly, application files may be dynamically streamed to the user's computer system (specifically to the virtual application) without being stored on the local computer system's file system. Each data file dynamically retrieved from the network data store appears to the virtual software application as if the data files were being received from the computer system's file system.

Additionally or alternatively, an application service on the local computer system or the I/O filter may provide services to translate or otherwise modify the received data to ensure that it is readable by the local computer system. Because the application data may be stored in any format, any encryption type and any compression type on the network data store, the application service or I/O filter may be configured to decompress, decrypt and/or reformat the received data to change the data to a readable form. Other operations may also be performed by this service, as needed. In this manner, the system may be implemented without making any changes to the application's native stack.

FIG. 3 illustrates a flowchart of a method 300 for allocating application data between local and network data stores. The method 300 will now be described with frequent reference to the components and data of environment 400 of FIG. 4.

Figure 4:
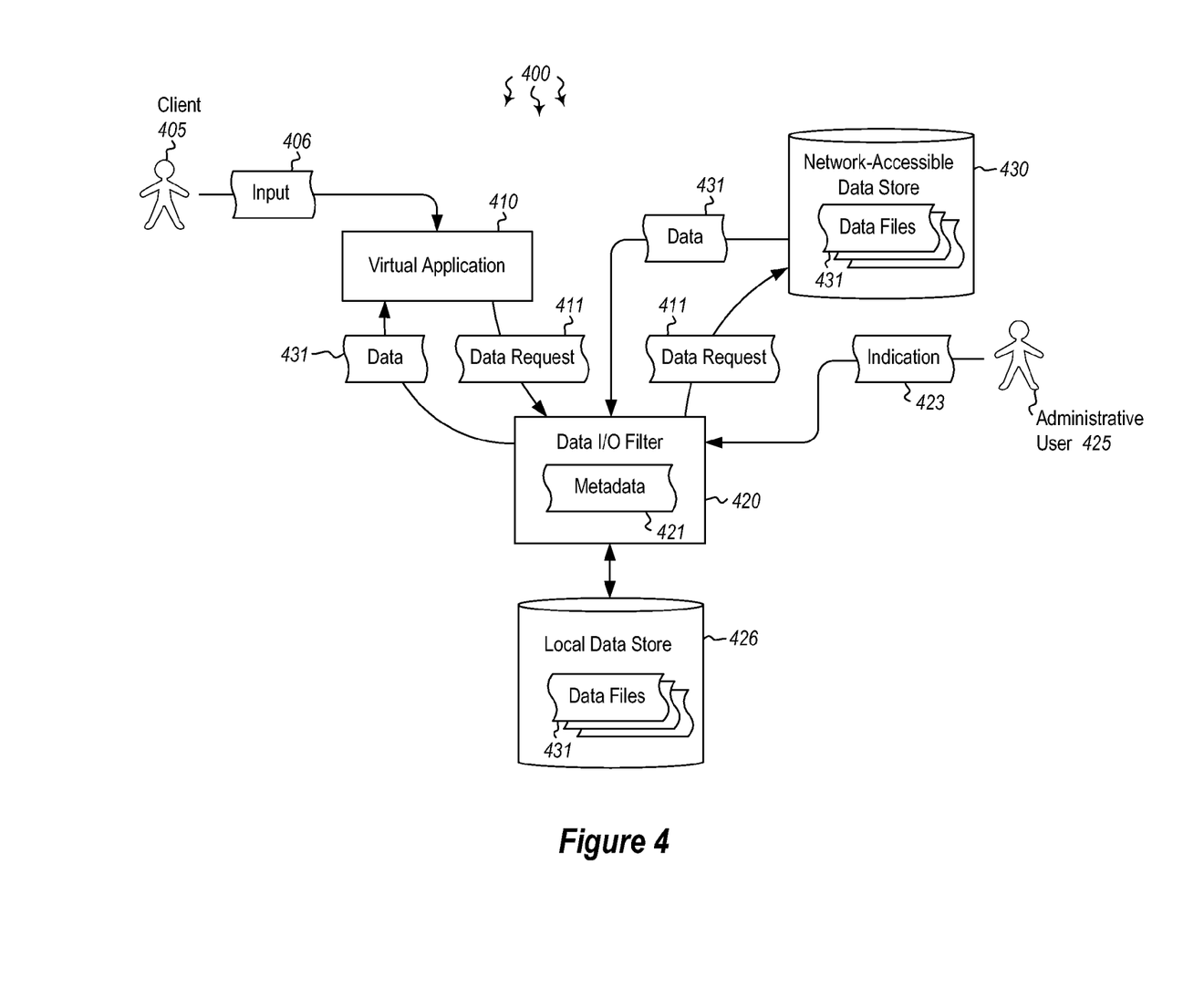
FIG. 4 illustrates an embodiment of the present invention in which data is allocated between local and network data stores.

Method 300 includes an act of receiving from an administrative user an indication of which specified portions of a virtual application are to be stored in a local data store and which portions are to be stored in a network data store (act 310). For example, data I/O filter 420 may receive indication 423 from administrative user 425 indicating which specified portions of virtual application 410 are to be stored in local data store 426 and which portions are to be stored in network-accessible data store 430. Thus, at least in some cases, it may be desirable for a computer administrator to specify that some files be stored locally, on the user's local computer system, while other data files are stored on the remote data store. The administrator may specify which files are stored where, and may update that determination while the user is using the virtual application 410. Accordingly, files 431 that were stored on the local data store 426 may be removed if so specified by the administrator. Conversely, data files may be moved from the network-accessible data store to the local data store if so specified by the administrator. It should be noted that when referring to data files being stored locally, the files are stored locally and exist on disk, but as empty sparse files containing only file name and size information.

The administrator may also update application packages on the network data store 430. Then, the next time the updated files are requested by the virtual application, the updated files are provided in place of the old versions. As such, the virtual application may be updated by switching to a new application package. These updated files may be provided to all of the users that subsequently access those files. New files are created on the local file system to replace any local files that need updating.

Method 300 also includes an act of generating one or more portions of metadata describing which specified portions of the virtual application are stored on the local data store (act 320). The local computer system may generate metadata 421 which is used by the data I/O filter to determine where to forward data requests 411 received from the virtual application 410. The metadata indicates, for each file, where the data file is stored (either locally 426 or remotely 430). Thus, when the data I/O filter receives a data request from the virtual application, instead of automatically forwarding the request to the user-mode service 115 (or directly to the network data store), the data I/O filter accesses the metadata 421 to determine whether the data is stored locally or on the remote store. If the data is stored locally, the data request is sent to the local file system. If the data is stored remotely, the data request is sent to the network data store. Thus, as explained above, an administrator 425 may indicate where each file is to be stored, and the data I/O may be apprised of the administrator's choices as they are made (via indication 423). Accordingly, the metadata may be continually updated as the administrator allocates data files, and the data I/O filter may correctly forward the data request based on the updated metadata.

Thus, as described above, a data file request 411 may be received from a virtual application requesting the data of a specified data file (act 330). The data I/O filter 420 may then determine, based on the generated metadata 421, whether the specified data file is stored on the local data store 426 or the remote data store 430 (act 340). Based on that determination, the data I/O filter sends the data file request to either the local data store or the remote data store (act 350). The data file requests may be received singularly or in plural, and may be forwarded to the appropriate data store singularly or in plural. Similarly, the data 431 may be received as single files or as groups of files. In some cases, different data requests may be being sent to both the local data store and the remote data store simultaneously. When the data requests are satisfied by the respective data stores, the data may be sent back to the data I/O filter, and then on to the virtual application as single files or in groups of files. In some cases, the data may be streamed from either or both of the local data store and the remote, network-accessible data store. As the data from the remote data store is received, it is passes on to the virtual application without storing any data on the local data store.

Accordingly, methods, systems and computer program products are provided which dynamically deliver virtual software applications. As the virtual application is used by the user, data files are dynamically and automatically streamed from the network data store as needed by the virtual application. Moreover, methods, systems and computer program products are provided which allow dynamic data allocation between local and network-accessible data stores.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for dynamically delivering data to one or more virtual software applications, the method comprising:
    an act of establishing a data input/output (I/O) filter configured to intercept data file requests being sent from a virtual software application to an operating system's file system;
    an act of the data I/O filter intercepting a data file read request that is configured to retrieve a specified data file from the file system;
    an act of the data I/O filter forwarding the intercepted read request to a network-accessible data store configured to return the specific data file;
    an act creating a sparse file corresponding to the specified file in response to the data file read request; and
    upon receiving the specified data file from the network data store, an act of the I/O filter sending the specified data file to the virtual software application, such that the specified data file is usable by the virtual application in response to its read request.

2. The method of claim 1, wherein a plurality of data files are intercepted and streamed to dynamically provide each file needed by the virtual software application.

3. The method of claim 1, wherein the data files received from the network data store are not stored on the computer system's file system.

4. The method of claim 1, wherein each data file dynamically retrieved from the network data store appears to the virtual software application as if the data files were being received from the computer system's file system.

5. The method of claim 1, wherein the I/O data filter is implemented without making changes to how the software application requests data files.

6. The method of claim 1, wherein the requested data files are streamed from the network data store to the computer system.

7. The method of claim 1, wherein the intercepted request is sent to a user-mode service that is configured to forward the request to the network data store and receive the requested data from the network store.

8. The method of claim 7, wherein the user-mode service forwards the received data to the I/O filter, which forwards the data to the virtual application.

9. The method of claim 1, wherein the data read request is converted to a kernel-mode I/O request which is intercepted by the I/O filter.

10. The method of claim 1, wherein the network data store comprises the cloud, and wherein the specified data file is retrieved from the cloud using the hypertext transfer protocol.

11. The method of claim 1, wherein the I/O filter comprises a driver running as part of an operating system process.

12. The method of claim 1, wherein upon receiving the first data read request, a sparse file is created on the file system, the sparse file including the file name and file size of the requested data file.

13. At a client computer system including at least one processor and a memory, in a computer networking environment including a plurality of computing systems, a computer-implemented method for allocating application data between local and network data stores, the method comprising:
   an act of receiving from an administrative user an indication of which specified portions of a virtual application are to be stored in a local data store and which portions are to be stored in a network data store;
   an act of generating one or more portions of metadata describing which specified portions of the virtual application are stored on the local data store;
   an act of receiving a data file request from a virtual application requesting the data of a specified data file;
   an act of determining, based on the generated metadata, whether the specified data file is stored on the local data store or the remote data store; and
   based on the determination, an act of sending the data file request to at least one the local data store and the remote data store, wherein when it is determined that the specified data file is stored on the remote data store, the method further includes creating a spare file for the specified data in response to the data file request.

14. The method of claim 13, wherein the administrative user updates an application on the network data store by replacing the application package.

15. The method of claim 14, wherein a local service on the local computer system is configured to perform at least one of the following to ensure that the data is readable by the local computer system: decrypt the data files, reformat the data files and decompress the data files.

16. The method of claim 13, further comprising, in response to sending the data file request to at least one the local data store and the remote data store, an act of receiving the requested data file from at least one of the local data store and the remote data store.

17. The method of claim 16, wherein upon determining that the requested data file was stored in the local data store, automatically updating the generated metadata to indicate the stored location of the requested data file.

18. A computer system comprising the following:
   one or more processors;
   system memory;
   one or more computer-readable storage media having stored thereon computer-executable instructions that, when executed by the one or more processors, causes the computing system to perform a method for dynamically delivering virtual software applications, the method comprising:
      an act of establishing a data input/output (I/O) filter configured to intercept data file requests being sent from a virtual software application to a file system;
      an act of I/O filter intercepting a data file read request that is configured to a retrieve a specified data file from the file system;
      an act of creating a sparse file on the file system for the requested data file, the sparse file including placeholder information for the requested data file including the file's name and size;
      an act of indicating to the virtual software application that the file exists, the indication including the requested data file's file name and size;
      an act of receiving a request from the virtual software application for the actual data content of the requested data file;
      an act of forwarding the intercepted read request to a user-mode service that forwards the data request to a network-accessible data store configured to return the specific data file; and
      upon receiving the specified data file from the network data store at the user-mode service, an act of the user-mode service forwarding the data file content to the I/O filter which sends the data file content to the virtual software application, such that the specified data file is usable by the virtual application in response to its read request.

19. The computer system of claim 18, wherein the requested data file is streamed to the virtual software application without saving any of the data file's contents on the file system.

20. The computer system of claim 19, wherein as the virtual software application is used by the user, data files are dynamically and automatically streamed from the network data store as needed by the virtual application.

* * * * *